Jan. 31, 1933.   O. G. WELLTON   1,895,841
CONTINUALLY VARIABLE CHANGE SPEED GEAR
Filed Aug. 29, 1931   3 Sheets-Sheet 1

Inventor:
O. G. Wellton
By E. F. Wendroth
Atty

Jan. 31, 1933. O. G. WELLTON 1,895,841
CONTINUALLY VARIABLE CHANGE SPEED GEAR
Filed Aug. 29, 1931 3 Sheets-Sheet 2

Inventor:
O. G. Wellton

Jan. 31, 1933.   O. G. WELLTON   1,895,841
CONTINUALLY VARIABLE CHANGE SPEED GEAR
Filed Aug. 29, 1931   3 Sheets-Sheet 3

Inventor:
O. G. Wellton

Patented Jan. 31, 1933

1,895,841

UNITED STATES PATENT OFFICE

OTTO GOTTFRIED WELLTON, OF SALTSJOBADEN, SWEDEN

CONTINUALLY VARIABLE CHANGE SPEED GEAR

Application filed August 29, 1931, Serial No. 560,181, and in Sweden September 6, 1930.

My present invention refers to continually variable change speed gears adapted for transmission of rotational movement from a driving shaft to a driven one. The invention has for its main object to provide a change speed gear of this type, which is cheap in manufacture and reliable in action, even at great speeds. Further the invention has for its object to provide a continually variable change speed gear the gear ratio of which may be varied according to will, so that it will be possible, for instance when the driving shaft has a constant and comparatively great speed, to give the driven shaft any desired speed within limits ranging from zero and up to a certain maximum value, and therein, when starting the driven shaft, to transfer to the same a great starting torque.

The change speed gear according to the invention is especially adapted to be applied to locomotives or motor driven cars, for instance railway cars driven by Diesel engines, or other internal combustion engines, which otherwise must have been brought up to a certain running speed before being able to generate the amount of power needed for starting the car when at rest, but the invention is not limited to such use only, and it may be used at advantage in many other instances when it is desired to vary the gear ratio between the driving shaft and the driven one.

The invention is based on the employment of a new and special kind of gear which may be termed a deformation gear as a distinction from common friction gears having at least one gear member made from comparatively soft and resilient material. In the deformation gear according to the invention both of the gear members are very hard, and they are pressed against each other under a very high pressure. Thereby this pressure will cause a deformation of both members, so that one of them at the line of contact will plow a furrow in the other, but the elasticity of the members must be so great that this deformation will not be permanent. Thereby the gear members will regain their original shape when the contact pressure has ceased, and the apparatus will act substantially as a toothed gear having one tooth in mesh at the same time only, and wherein the pitch of the gear is infinite.

According to the invention the change speed gear consists of at least one deformation gear of this kind, which is connected with an intermediate shaft, so that the latter, when the driving shaft is running at a constant speed, may be brought to rotate at different speeds, this deformation gear being combined with a differential gear, the sun wheels of which are connected with the driving shaft and the intermediate one (or when two deformation gears are employed they are connected with two intermediate shafts belonging thereto), so that the sun wheels are brought to rotate in opposite directions, the sun wheels being positioned in mesh with the planet wheels of the differential gear at opposite sides, and the planet wheel support of the differential gear being connected with the driven shaft.

A construction based on the employment of two deformation gears and two intermediate shafts connected therewith has the advantage over the construction based on the employment of one single deformation gear that a certain desired variation of the gear ratio may be obtained by a smaller change of position of the gear wheels in relation to each other, and a saving of space may be obtained thereby, if required.

By connecting the driven shaft with the planet wheel support of the differential gear, so that the speed of the former becomes proportional to the difference in speed between the two sun wheels, it will obviously be possible to start the driven shaft even when the sun wheels rotate at great speeds. When applying the invention to internal combustion engines, this means that the driven shaft will get a great starting torque which is sufficient for starting heavy motor cars or trains.

When using two deformation gears each connected with a corresponding intermediate shaft, both of these gears may suitably be constructed in the shape of plane wheel gears having a disc member common to both of them, such disc member being connected with and driven by the driving shaft, and the gear wheels coacting with said disc may be mounted at opposite sides thereof. The advantage hereof is that the pressures of the gear wheels may counteract each other, so that the bearing members of the disc will not be subjected to heavy axial stresses, or thrusts, even if the contact pressure between the wheels and the disc is very high.

The accompanying drawings show an embodiment of the invention applied to a change speed gear provided with two deformation gears constructed in the form of plane wheel or disc gears having a common disc as hinted at above. In the drawings:—

Figure 1:
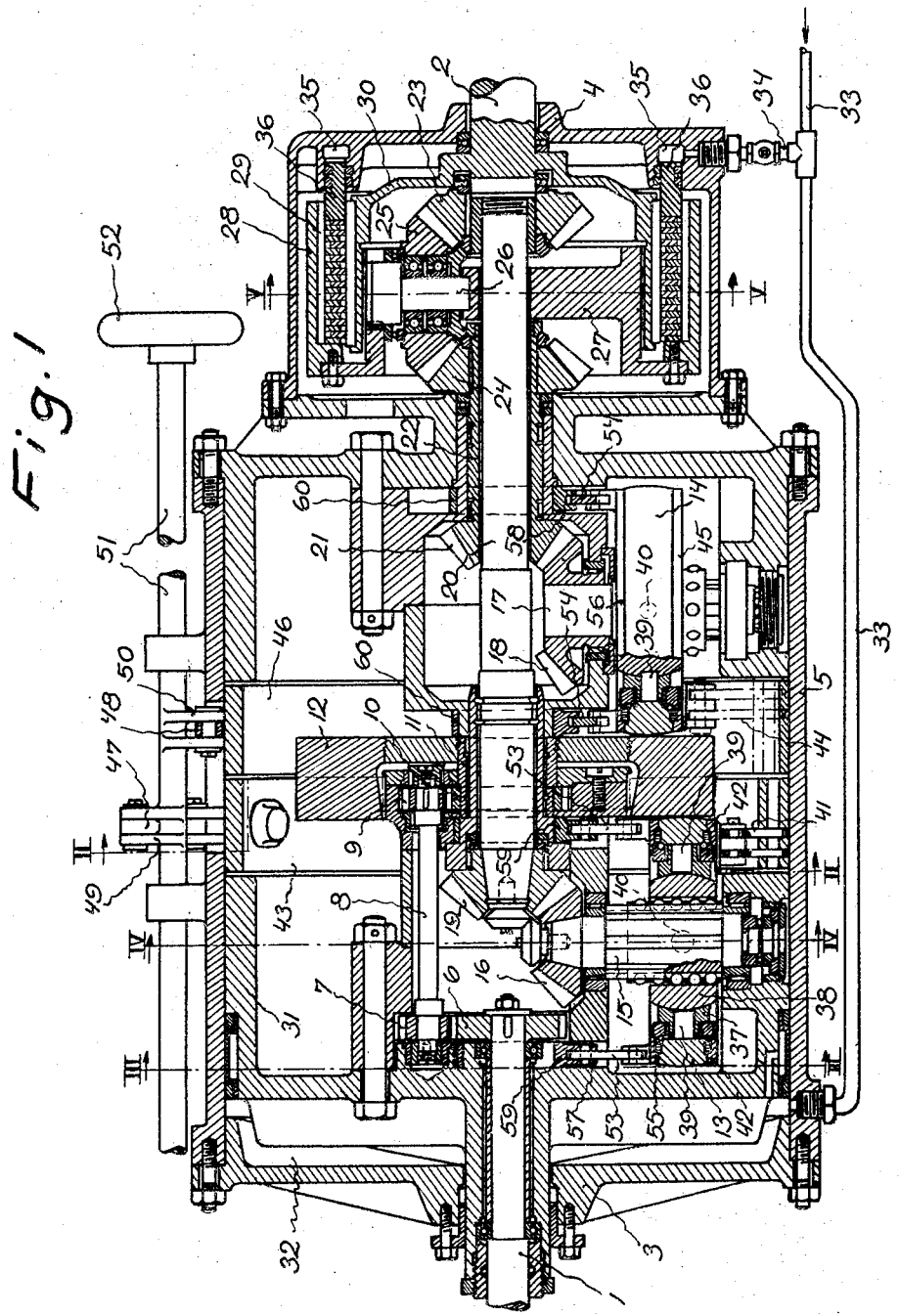
Fig. 1 is a longitudinal section of the change speed gear.
Figure 2:
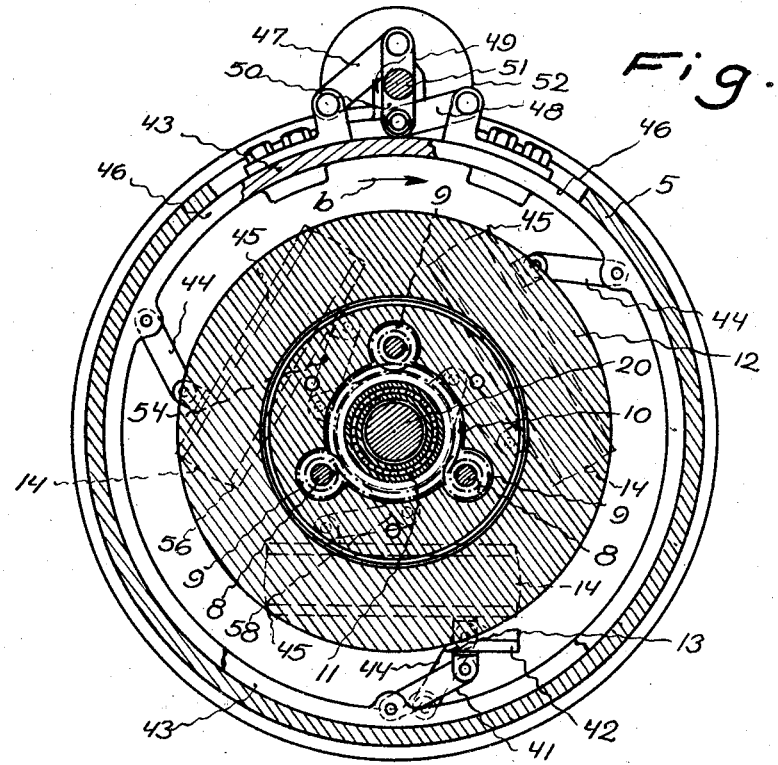
Fig. 2 is a cross section thereof at the line II—II in Fig. 1.
Figure 3:
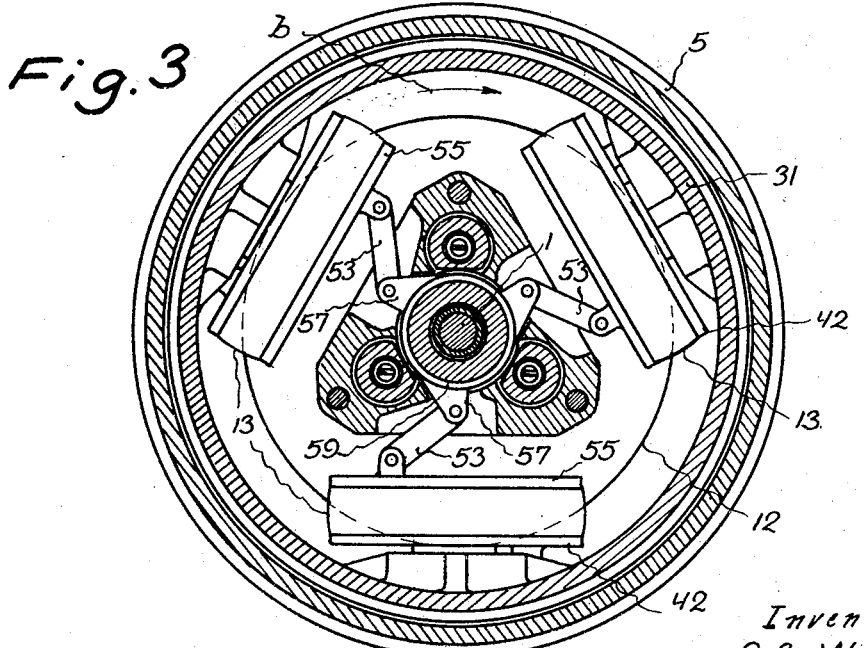
Fig. 3 is a cross section at the line III—III in Fig. 1.

In the embodiment shown in the drawings for the sake of explanation, 1 represents the driving shaft, and 2 the driven one, both of such shafts being supported in suitable bearings 3 and 4 at the opposite ends of a casing 5 enclosing the different constructional parts of the mechanism. At the end of the driving shaft 1 extending into the casing 5 is affixed a toothed gear 6 positioned in mesh with smaller toothed wheels, or pinions, 7 each mounted on a corresponding shaft 8 rigidly mounted in the casing 5 in suitable bearings. In the embodiment shown, the wheels 7 and the corresponding shafts 8 are three in number, but another number thereof may also be employed.

At their inner ends each of the said shafts 8 is provided with a pinion 9 meshing with a common toothed wheel 10 rigidly secured to a hollow shaft 11 which is also rigidly secured to a disc 12 belonging to the deformation gears, this gear disc hereby being driven from the driving shaft 1.

At each side of the gear disc 12 is provided a set of coacting deformation gear wheels 13 and 14 respectively, such gear wheels being preferably spherical at their circumferences and adapted to be pressed against the common gear disc 12 from opposite sides thereof. Both the disc 12 and the wheels 13, 14 are of a very hard but somewhat elastic material, such as tempered steel. In the embodiment shown, three wheels 13 and 14 are mounted at each side of the disc, and preferably they take a symmetrically interspaced position around the axis of rotation of the disc 12. In the set of wheels 13 positioned to the left of the disc 12 (Fig. 1), each wheel is displaceably mounted on a radially extending shaft 15 the inner end of which is provided with a bevel gear 16, and in the set of wheels 14 positioned at the right of the disc 12, each wheel is displaceably mounted on a radially extending shaft 17, the inner end of which is provided with a bevel gear 18. The three gears 16 are in mesh with a common bevel gear 19 affixed to one end of an intermediate shaft 20 extending through the hollow shaft 11 of the deformation gear disc 12, and the three gears 18 are in mesh with a common bevel gear 21 affixed to one end of another intermediate shaft 22 which is tubular and surrounds the first mentioned intermediate shaft 20. The two intermediate shafts 20 and 22 are each connected with one of the two sun wheels 23 and 24, respectively, of a differential gear mounted at the right hand end (Fig. 1) of the casing 5 and provided with three planet wheels 25 meshing at opposite sides with the two sun wheels 23 and 24. The planet wheels 25 are affixed to short radial shafts 26 supported in suitable bearings by the planet wheel support 27 which is rotatably mounted around the intermediate shaft 20. The said shaft 20 is rigidly connected with a drum 28 connected by means of a laminated friction clutch 29 with a second drum 30 rigidly secured to the driven shaft 2.

It will be obvious that in case the deformation gear disc is set into rotation, the deformation gear wheels 13 and 14 positioned at opposite sides thereof will be brought to rotate in opposite directions, so that the sun wheels 23 and 24 will also be rotated in opposite directions. In case the gear wheels 13 and 14 are adjusted into such a position in relation to the centre of the gear disc 12 that the sun wheels 23 and 24 are brought to rotate with the same speed in opposite directions, no rotational movement will be transmitted to the driven shaft 2, as the planet wheels 25 will thereby rotate around their own shafts only the planet wheel support 27 being at a rest.

In order to transmit a rotational movement to the driven shaft 2, it is necessary to vary the speed of at least one of the sun wheels, so that such speed will be smaller or greater than the speed of the other sun wheel, and an adjustment of this kind may be performed by displacement of the deformation gear wheels (13 or 14) connected with the corresponding sun wheel in relation to the centre of the deformation gear disc 12.

In the embodiment shown in the drawings, the construction is of such a kind that the gear ratio between the wheels 13 and the sun wheel 23 connected therewith, and that between the wheels 14 and the sun wheel 24 connected therewith, is selected in a manner so that the sun wheels 23 and 24 are brought to rotate in opposite directions with the same speed, when the wheels 13 and 14 take the positions shown in Fig. 1, wherein the wheels 13 are positioned at a greater distance from the centre of the gear disc 12 than the wheels 14. Therefore the driven shaft 2 will be at a rest when the wheels 13 and 14 are in the positions shown.

The starting of the shaft 2 is intended to be performed by displacement of the gear wheels 13 inwardly towards the centre of the disc 12 while simultaneously displacing the gear wheels 14 outwardly towards the circumference of the disc 12, so that the speed of the sun wheel 23 will be reduced simultaneously as the speed of the sun wheel 24 will be increased. Hereby the shaft 2 will be set into rotation, and it will attain a speed which in every moment is proportional to the difference in speed between the two sun wheels. By mounting the gear wheels 13 and 14 in the manner described above, so that they are initially at different distances from the centre of the gear disc 12, and by the simultaneous displacement of the same inwardly and outwardly, respectively, the distinct advantage is gained that the greatest possible variation of the speed of the driven shaft 2 will be obtainable with the smallest possible displacement of the gear wheels 13, 14 in radial direction.

In order to make it possible to transmit the desired amount of power from the driving shaft 1 to the driven shaft 2, it is necessary that the deformation gear wheels 13 and 14 are pressed against the gear disc 12 with a certain amount of pressure, so that the required amount of torque is transmitted to the shafts 15 and 17. In the embodiment shown in the drawings, this pressure is obtained by the mounting of the shafts 15 of the gear wheels 13 at one side of the gear disc 12 in a piston 31 slidably mounted in the casing 5, such piston 31 being acted upon by a suitable pressure fluid tending to press the same against the gear disc 12 which in itself is mounted for a slight displacement in axial direction.

By means of a pipe 33 the chamber 32 between the piston 31 and the left hand end wall of the casing 5 (Fig. 1) stands in connection with a pressure fluid container (not shown) which for instance contains oil under a high pressure. By admittance of oil under a sufficiently high pressure into the chamber 32, the required contact pressure between the gear disc 12 and the gear wheels 13 and 14 may be obtained. A branch pipe 34 extends from the pipe 33 into an annular chamber 35 at the right hand end wall of the casing 5. An annular piston 36 is slidably mounted in said chamber, and by displacement of said piston towards the left in the drawings (Fig. 1) the laminated friction clutch 29 is engaged, the said clutch being thus actuated by admittance of oil under pressure into the chamber 35. The faces of the pistons 31 and 36 subjected to the oil pressure are dimensioned in such a manner in relation to each other, that the clutch 29 will slide before a sliding can occur between the gear disc 12 and the gear wheels 13, 14, in case the load on the driven shaft should become too great. Hereby a damaging of the contact surfaces of the deformation gears is prevented.

In order to make it possible to displace the deformation gear wheels 13 and 14 radially inwardly or outwardly in relation to the gear disc 12 without the necessity of relieving the fluid pressure acting upon the piston 31, the wheels 13 and 14 are not only slidably mounted on their shafts 15 and 17, respectively, but they are also mounted so as within certain limits to be permitted to take an inclined position to the shafts. For this purpose, each of the wheels 13 or 14 is composed of three rings, viz. an outer ring 13 and 14, respectively, which forms the wheel rim proper, an intermediate ring 37, and an inner ring 38 which latter is slidable on its shaft by the intermediary of balls, as shown in Fig. 1, but it is not rotatable relatively to the shaft. In each gear wheel all of these rings are connected with each other in the same manner as the members of a universal joint, the outer ring 13 or 14 being connected with the intermediate ring 37 by means of two diametrically opposite pivots 39, and the said intermediate ring being connected with the inner ring 38 by means of a similar pair of pivots 40 positioned at right angles to the pivots 39. Hence, it will be possible to adjust the outer wheel rings, or rims, 13 and 14 into a position inclining a little to the axis of the shafts 15 and 17, respectively.

In order that an adjustment of this kind may be performed, each wheel 13, by means of a link 41, is connected with an adjustment ring 43 common to all of the wheels 13 and turnably mounted the housing 5, one end of said link 41 being hingedly connected with a ring 43 rotatably connected with the wheel rim 13 so as not to take part in the rotation of the latter. In a similar manner, each of the wheels 14, by means of a link 44, is connected with another adjustment ring 46 turnably mounted in the housing 5, and each of the links 44 at its one end is hingedly connected with a ring 45 rotatably connected with the rim 14 of the corresponding wheel so as not to take part in the rotation of the same, just as described with reference to the wheels 13. By means of links 47 and 48, the two adjustment rings 43 and 46, respectively, are connected with arms 49 and 50 on a control shaft 51 mounted exteriorly of the housing 5 in suitable bearings thereon and provided with a hand wheel 52 or the like adapted for imparting a rotational movement to the control shaft. The arms 49 and 50 are positioned in such a relation to each other and to the direction of the links 47 and 52, respectively, that the adjustment rings 43 and 46 are turned in opposite directions when rotating the control shaft 51, and thereby the said adjustment rings will adjust the gear wheels 13 and 14 into an opposite inclination in relation to their shafts 15 and 17, respectively.

Figure 4:
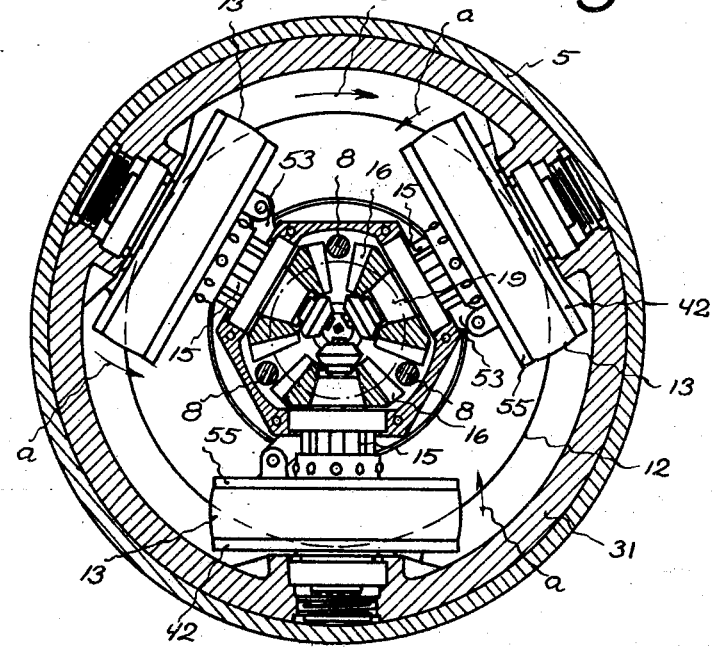
Fig. 4 is a cross section at the line IV—IV in Fig. 1.
Figure 5:
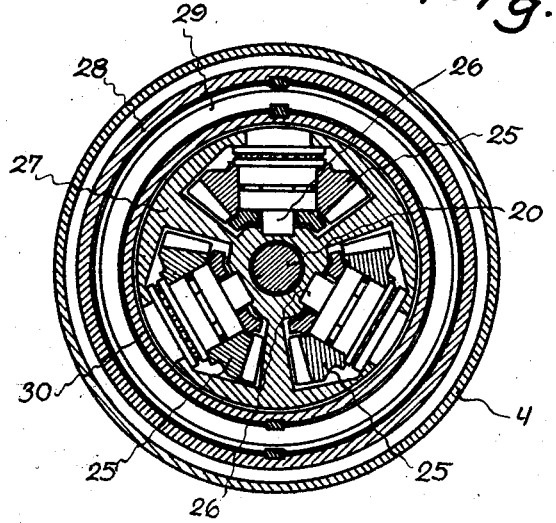
Fig. 5 is a cross section at the line V—V in the same figure.

If, for instance, the three deformation gear wheels 13 shown in Fig. 4 are swung a little in the direction of the arrows *a* by means of the control members just described, so that they do not longer take a position at right angles to the radii of the disc 12 at the points of contact, the rotation of the disc 12 in the direction indicated by the arrow *b* will cause the gear wheels 13 to roll along a helical path on the disc, and to be displaced towards the centre of the same, as long as the turning of the adjustment ring 43, or the control shaft 51 is maintained. Simultaneously herewith the gear wheels 14 are swung in a similar manner by means of the adjustment ring 43, but in opposite direction, i. e. opposite to the direction of the arrows *a*, and thereby the said wheels 14 will be caused to roll along a helical path at the opposite side of the gear disc 12, so that the said wheels are displaced outwardly towards the circumference of the latter.

A displacement of the gear wheels 13 and 14 in the manner just described will result in a difference in speed between the two sun wheels 23 and 24, as hinted at in the foregoing, and thereby the driven shaft 2 will be set into rotation. The aforesaid difference in speed, and thereby also the speed of the driven shaft 2, will naturally be increased the longer the turning of the control shaft 51 is maintained. When the turning of the control shaft has ceased, the gear wheels 13 and 14 will regain a position at right angles to their shafts, and then the driven shaft 2 will continue in rotating at the speed adjusted by the radial displacement of the gear wheels 13 and 14.

Besides, of the links 41 and 44 described above and adapted to adjust the gear wheels into a position of inclination, the said wheels are also adapted to be guided in their inclined positions by means of two guide links 53 and 54 for each of them. At one end the said guide links are connected with a ring 55 and 56 rotatably connected with the wheel rims 13 and 14, respectively, so as not to take part in the rotation of the latter, and the rings 55 and 56 are in a suitable manner connected with the rings 42 and 45, respectively, at the opposite side of the wheels, the connection being performed in two points which are spaced by 120° in relation to each other and to the point of connection of the adjustment links 41 and 44. At the other end the guide links 53 and 54 are connected with arms 57 and 58, respectively, on turnable rings 59 and 60, respectively, common to all of the gear wheels in each set thereof. In this manner the three wheels in each set will be positively coupled to each other this construction securing that all of them will be given an equal inclination to the shafts 15 and 17 at the adjustment.

It is to be noted that the embodiment described above and shown in the drawings for the purpose of explanation is to be considered as a constructional example only, and that the invention is not limited to the same. The parts of construction may be modified within wide limits without departing from the principle of invention. It is not necessary that the two sets of gear wheels 13 and 14 are radially displaced, or adjusted, at the same time, but they may each be combined with a separate control shaft, such shafts being independent of each other and adapted each to coact with one of the adjustment rings 43 or 46 only. Finally it is not necessary to employ two deformation gears 12, 13 and 12, 14, respectively, and it is also possible to employ one of them only and directly to connect the driving shaft 1 with one of the sun wheels of the differential gear.

The invention involves the possibility to obtain great amounts of torque on the driven shaft 2 due to the fact that the torques of the two sun wheels 23 and 24 are always equal to each other and oppositely directed so that they will counterbalance the actions of each other on the gear disc 12 when the shaft 2 is at a rest. Hereby the gear wheels 13 and 14 will take certain definite positions. At a displacement of one or both of the sets of gear wheels 13 and 14 the oppositely directed torques transmitted from the two sun wheels 23 and 24 will cause a difference of torque in the gear disc 12 corresponding to the amount of torque which must be entered by means of the driving shaft 1.

What I claim and desire to secure by Letters Patent is:—

1. In a continually variable change speed gear, a driving shaft, at least one deformation gear consisting of hard but somewhat elastic gear members having smooth surfaces in contact with each other and adapted for variation of the gear ratio by displacement of said gear members in relation to each other, means for exerting a great contact pressure between said gear members, an intermediate shaft connected with the deformation gear and adapted to be rotated by the same at a variable speed when the driving shaft is running at a constant speed, a differential gear the sun wheels of which are connected with the driving shaft and with the intermediate shaft, respectively, and adapted to rotate in opposite directions, whereas the planet wheels of the differential gear are in mesh at opposite sides with the said sun wheels, a planet wheel support means, and a driven shaft connected with said planet wheel support.

2. In a continually variable change speed gear, a driving shaft, two coacting deformation gears consisting of hard but somewhat elastic gear members having smooth surfaces in contact with each other and adapted for variation of the gear ratio by displacement of said gear members in relation to each other, means for exerting a great contact pressure between the members of the deformation gears, an intermediate shaft for each of the deformation gears and adapted to be rotated by the corresponding gear at a variable speed when the driving shaft is running at a constant speed, a differential gear the sun wheels of which are each connected with one of the intermediate shafts and adapted to rotate in opposite directions, whereas the planet wheels of the differential gear are in mesh at opposite sides with the said sun wheels, a planet wheel support means, and a driven shaft connected with said planet wheel support.

3. In a continually variable change speed gear according to claim 2, the additional feature that the deformation gears are in the shape of plane wheel gears having a common gear disc connected with the driving shaft and driven thereby, the gear wheels of the separate deformation gears being positioned in contact with said disc at opposite sides thereof.

4. In a continually variable change speed gear, a driving shaft, two coacting deformation gears consisting of hard but somewhat elastic gear members having smooth surfaces in contact with each other and adapted for variation of the gear ratio by displacement of said gear members in relation to each other, the deformation gears consisting of a common gear disc and two sets of gear wheels positioned in contact with said disc at opposite sides thereof, means for exerting a great contact pressure between the members of the deformation gears, and means for connecting the common gear disc with the driving shaft, an intermediate shaft connected with each of the sets of deformation gear wheels and adapted to be driven thereby at a variable speed when the driving shaft is running at a constant speed, a differential gear the sun wheels of which are each connected with the corresponding set of deformation gear wheels by means of gears adapted to rotate the sun wheels at the same speed in opposite directions when the deformation gear wheels at the opposite sides of the gear disc are at a different distance from the centre of the said disc, means for adjusting the distance of the deformation gear wheels in relation to the centre of the deformation gear disc, a number of planet wheels belonging to the differential gear and positioned in mesh at opposite sides with the sun wheels thereof, a planet wheel support means, and a driven shaft connected with said planet wheel support.

5. In a continually variable change speed gear according to claim 4, the additional feature of means connecting the two sets of deformation gear wheels and adapted for simultaneous displacement of the same in opposite directions in relation to the centre of the common deformation gear disc.

6. In a continually variable change speed gear according to claim 4, the additional feature that the set of deformation gear wheels at one side of the common deformation gear disc is connected with a piston member slidably mounted in a casing surrounding the gear members and adapted to be acted upon by fluid pressure for exerting the required contact pressure, the common deformation gear disc being slightly displaceable in axial direction when acted upon by said pressure.

7. In a continually variable change speed gear according to claim 4, the additional feature of a slidable clutch member interposed between the planet wheel support and the driven shaft, such slideable clutch being adapted to be engaged by means of a piston actuated by fluid pressure.

8. In a continually variable change speed gear according to claim 4, the additional feature of means for displacement of the deformation gear wheels in radial direction in relation to the common deformation gear disc, and means for obtaining an inclination of said gear wheels in relation to the radii of the gear disc at the radial displacement of the former.

9. In a continually variable change speed gear according to claim 4, the additional feature that each of the deformation gear wheels consists of three concentric annular members tiltably interconnected according to the principles of a universal joint, the outermost annulus by means of a link mechanism being connected with manually operable adjustment means adapted for obtaining an inclination of the said outermost wheel ring in relation to the radii of the deformation gear disc.

10. In a continually variable change speed gear, a driving shaft, a deformation gear disc connected with said driving shaft and consisting of a hard but somewhat elastic material, a set of deformation gear wheels produced from a material of the same nature as the gear disc and rotatably mounted in contact with one side of the same on shafts positioned radially in relation to the axis of rotation of said disc, an intermediate shaft connected with said set of gear wheels and adapted to be rotated by the same, a second set of deformation gear wheels produced from a similar material as the first mentioned one and rotatably mounted in contact with the opposite side of the gear disc in a similar manner, a second intermediate shaft connected with said second set of deformation gear wheels and adapted to be rotated by the same in a direction opposite to the direction of rotation of the first mentioned intermediate shaft, means for radial displacement of the first set of gear wheels in relation to the gear disc, means for a simultaneous displacement of the second set of gear wheels in the same manner but in opposite direction, means for slidably mounting of one set of gear wheels in axial direction in relation to the gear disc, means for exerting a great pressure on said slidably mounted set of gear wheels towards the gear disc mounted between the two sets of such wheels, a differential gear the sun wheels of which are each connected with one of the intermediate shafts, whereas the planet wheels of the differential gear are in mesh at opposite sides with the said sun wheels, a planet wheel support means, and a driven shaft connected with the said planet wheel support by the intermediary of a slidable clutch.

11. In a continually variable change speed gear according to claim 10, the additional features that the means for slidable mounting of one set of deformation gear wheels is given the shape of a piston member slidably mounted in a corresponding cylinder means and acted upon by fluid pressure in a direction towards the deformation gear disc; that the slidable clutch is adapted to be engaged by means of another piston member acted upon for engagement by the same fluid pressure; and that the working faces of the two piston members referred to are dimensioned in a relation to each other so as to permit the clutch to slide before a sliding movement can occur between the sets of deformation gear wheels and the deformation gear disc contacting therewith.

12. In a continually variable change speed gear according to claim 10, the additional feature of means adapted for performing an inclination of one set of deformation gear wheels in relation to the radii of the gear disc at the radial displacement of the former, and means for simultaneously performing a similar inclination of the second set of deformation gear wheels in opposite direction.

13. In a continually variable change speed gear according to claim 10, the additional features that each of the deformation gear wheels consists of a plurality of concentrically positioned annular members the outermost one of which has a spherical circumference adapted for contact with the deformation gear disc; and that the separate annular members of each deformation gear wheel are tiltably interconnected according to the principles of a universal joint.

14. In a continually variable change speed gear according to claim 10, the additional feature that the sun wheels of the differential gear and the corresponding intermediate shafts are connected with the corresponding set of deformation gear wheels by the intermediary of gears adapted to rotate the sun wheels at the same speed in opposite directions when the two sets of deformation gear wheels at the opposite sides of the deformation gear disc are at a different distance from the centre of said disc.

15. In a continually variable change speed gear according to claim 10, the additional features of means for performing an inclination of one set of deformation gear wheels in relation to the radii of the deformation gear disc at the radial displacement of the former, means for simultaneously performing a similar inclination of the second set of deformation gear wheels in opposite direction, and manually operable control means adapted for simultaneous actuation of both of the inclination performing means to an equal extent.

In testimony whereof I have signed my name to this specification.

OTTO GOTTFRIED WELLTON.